US012591891B2

(12) United States Patent (10) Patent No.: US 12,591,891 B2
Andrade (45) Date of Patent: Mar. 31, 2026

(54) SYSTEMS AND METHODS FOR PERSONAL IDENTIFICATION AND VERIFICATION

(71) Applicant: BLACK GOLD COIN, INC., Cheyenne, WY (US)

(72) Inventor: Marcus Andrade, Missouri City, TX (US)

(73) Assignee: BLACK GOLD COIN, INC, Cheyenne, WY (US)

( * ) Notice: Subject to any disclaimer, the term of this patent is extended or adjusted under 35 U.S.C. 154(b) by 0 days.

(21) Appl. No.: 17/663,765

(22) Filed: May 17, 2022

(65) Prior Publication Data

US 2022/0277307 A1 Sep. 1, 2022

Related U.S. Application Data

(63) Continuation of application No. 14/940,142, filed on Nov. 12, 2015, now abandoned.

(30) Foreign Application Priority Data

Mar. 27, 2015 (EP) ..................................... 15161502

(51) Int. Cl.
*G06Q 20/40* (2012.01)
*G06Q 20/36* (2012.01)
(Continued)

(52) U.S. Cl.
CPC ......... *G06Q 20/4014* (2013.01); *G06Q 20/36* (2013.01); *G06Q 20/3829* (2013.01);
(Continued)

(58) Field of Classification Search
CPC ........ G06Q 20/3821; G06Q 20/00–425; H04L 9/00–50
(Continued)

(56) References Cited

U.S. PATENT DOCUMENTS

| 5,291,560 A | 3/1994 | Daugman | |
| 5,787,172 A | * 7/1998 | Arnold .................. | H04L 9/3263 |
| | | | 713/157 |

(Continued)

FOREIGN PATENT DOCUMENTS

| CN | 103927656 A | 7/2014 |
| RU | 2509360 C1 | 3/2014 |

(Continued)

OTHER PUBLICATIONS

Bryans, D.; "Bitcoin and Money Laundering; Mining for an Effective Solution;" Indiana Law Journal; 89; (Issue 1; Article 13) pp. 441-472; 2014.
(Continued)

*Primary Examiner* — Ari Shahabi
(74) *Attorney, Agent, or Firm* — Whitaker Chalk Swindle & Schwartz PLLC; Juan Vasquez; Enrique Sanchez, Jr.

(57) ABSTRACT

A personal/client identification and verification process, pseudonymous system and transaction network for monitoring and restricting transactions of cryptography-based electronic money. The present invention—"legal identity-linked credential authentication protocol" is a protocol providing a practical solution for the issues related to cryptocurrency theft, KYC and AML, while maintaining user privacy.

8 Claims, 4 Drawing Sheets

(51) Int. Cl.
  *G06Q 20/38* (2012.01)
  *H04L 9/32* (2006.01)
(52) U.S. Cl.
  CPC ......... *G06Q 20/405* (2013.01); *H04L 9/3247*
    (2013.01); *G06Q 2220/00* (2013.01); *H04L*
    *2209/56* (2013.01)
(58) Field of Classification Search
  USPC ......................................................... 705/35
  See application file for complete search history.

(56) References Cited

U.S. PATENT DOCUMENTS

| | | | |
|---|---|---|---|
| 7,949,869 B2 | 5/2011 | Deshpande et al. | |
| 9,785,764 B2 | 10/2017 | Loughlin-Mchugh et al. | |
| 9,882,918 B1 | 1/2018 | Ford et al. | |
| 9,892,460 B1* | 2/2018 | Winklevoss ........... | G06Q 40/04 |
| 9,935,948 B2 | 4/2018 | Schultz et al. | |
| 10,269,009 B1* | 4/2019 | Winklevoss ......... | G06Q 20/105 |
| 11,282,139 B1* | 3/2022 | Winklevoss ........... | G06Q 40/04 |
| 2002/0147600 A1 | 10/2002 | Waters et al. | |
| 2002/0178354 A1 | 11/2002 | Ogg et al. | |
| 2005/0177750 A1 | 8/2005 | Gasparini et al. | |
| 2005/0182710 A1 | 8/2005 | Anderson et al. | |
| 2005/0246290 A1 | 11/2005 | Kausik | |
| 2007/0192853 A1 | 8/2007 | Shraim et al. | |
| 2009/0024853 A1 | 1/2009 | Yeap et al. | |
| 2009/0254440 A1 | 10/2009 | Pharris | |
| 2011/0137750 A1 | 6/2011 | Gani | |
| 2012/0084563 A1 | 4/2012 | Singhal | |
| 2013/0251214 A1 | 9/2013 | Chung | |
| 2013/0346309 A1 | 12/2013 | Giori | |
| 2014/0198330 A1 | 7/2014 | Gajera | |
| 2015/0043025 A1 | 2/2015 | Lahmi | |
| 2015/0143107 A1* | 5/2015 | Kale ..................... | H04L 63/065 |
| | | | 713/171 |
| 2015/0170112 A1* | 6/2015 | DeCastro ............. | G06Q 20/367 |
| | | | 705/39 |
| 2015/0178693 A1 | 6/2015 | Solis | |
| 2015/0220928 A1 | 8/2015 | Allen | |
| 2015/0237048 A1 | 8/2015 | Sun et al. | |
| 2015/0269538 A1 | 9/2015 | Stanchfield | |
| 2015/0287026 A1* | 10/2015 | Yang .................... | G06Q 20/065 |
| | | | 705/69 |
| 2015/0324789 A1 | 11/2015 | Dvorak et al. | |
| 2015/0332283 A1 | 11/2015 | Witchey | |
| 2015/0348017 A1 | 12/2015 | Allmen | |
| 2015/0356523 A1 | 12/2015 | Madden | |
| 2015/0356555 A1 | 12/2015 | Pennanen | |
| 2016/0027229 A1 | 1/2016 | Spanos et al. | |
| 2016/0217452 A1 | 7/2016 | Wong et al. | |
| 2016/0283941 A1 | 9/2016 | Andrade | |
| 2016/0292672 A1 | 10/2016 | Fay et al. | |
| 2016/0292680 A1 | 10/2016 | Wilson, Jr. et al. | |
| 2016/0330027 A1 | 11/2016 | Ebrahimi | |
| 2016/0358164 A1* | 12/2016 | Liao ..................... | H04L 9/3247 |
| 2017/0017936 A1 | 1/2017 | Bisikalo et al. | |
| 2017/0024579 A1 | 1/2017 | Lacey | |
| 2017/0222814 A1 | 8/2017 | Oberhauser et al. | |
| 2017/0243209 A1 | 8/2017 | Johnsrud | |
| 2017/0279801 A1 | 9/2017 | Andrade | |
| 2017/0286717 A1 | 10/2017 | Khi et al. | |
| 2017/0300978 A1 | 10/2017 | Narasimhan et al. | |
| 2017/0316390 A1 | 11/2017 | Smith et al. | |
| 2017/0317997 A1 | 11/2017 | Smith et al. | |
| 2018/0025442 A1 | 1/2018 | Isaacson et al. | |
| 2018/0075247 A1 | 3/2018 | Campero et al. | |
| 2022/0058579 A1* | 2/2022 | Chong ................... | G06Q 40/08 |

FOREIGN PATENT DOCUMENTS

| | | |
|---|---|---|
| RU | 2531569 C2 | 10/2014 |
| WO | 20150183901 A9 | 3/2015 |
| WO | 2018007828 A2 | 1/2018 |

OTHER PUBLICATIONS

European Patent Application No. EP15161502, Partial European Search Report, date of completion Oct. 6, 2015, 2 pages.

Extcoin, "Bitcoin Stack Exchange", https://bitcoin.stackexchange.com/questions/13984/bitcoin-network-splits ; Oct. 22, 2013, p. 1.

Goldfedder et al. ; Securing Bitcoin Wallets via Threshold Signatures. 2014. [retrieved on Jul. 13, 2016] Retrieved from the internet http;//www.cs.princeton.edu/ stevenag/bitcoin_threshold_signatures.pdf; 11 pages.

Koshy et al.; "An Analysis of Anonymity in Bitcoin Using P2P Network Traffic;" Pennsylvania State University; pp. 1-17; 2014.

Meiklejohn et al.; "A Fistful of Bitcoins: Characterizing Payments Among Men with No Names;" Univeristy of Californi, San Diego,; 2013, 13 pages.

Nakamoto, S.; Bitcoin; A Peer-to-Peer Electronic Cash System; 9 pages; www.bitcoin.org.

PCT Application No. PCT/IB2015/058805, International Search Report and Written Opinion mailed Apr. 13, 2016; 15 pages.

PCT International Application No. PCT/US16/024776, International Search Report, mailed Jun. 16, 2016, 2 pages.

PCT International Application No. PCT/US17/14938, International Search Report and Written Opinion mailed May 25, 2017, 10 pages.

PCT International Application No. PCT/US18/026136, International Search Report and Written Opinion mailed Jun. 15, 2018, 20 pages.

PCT International Application No. PCT/US18/029350, International Search Report mailed Jul. 19, 2018, 2 pages.

PCT International Application No. PCT/US18/029371, International Search Report, mailed Jul. 9, 2018, 2 pages.

Russia Search Report dated Jun. 25, 2019, 2 pages.

* cited by examiner

SYSTEMS AND METHODS FOR PERSONAL IDENTIFICATION AND VERIFICATION

CROSS REFERENCE TO RELATED APPLICATIONS

This application claims the priority benefit of U.S. patent application Ser. No. 14/940,142, filed Nov. 12, 2015, which claims priority from European Patent Application No. EP15161502.8 filed on Mar. 27, 2015, and entitled "A System and a Method for Personal Identification and Verification," both of which are incorporated herein by reference.

FIELD OF THE DISCLOSURE

The present invention relates to a system and method for personal identification and verification. In particular the present invention relates to personal/client identification and verification process, pseudonymous system and transaction network for monitoring and restricting transactions of cryptography-based electronic money—legal identity-linked credential authentication protocol.

BACKGROUND

Prior art defines digital currency or digital money. It is an internet based medium of exchange (i.e., distinct from physical, such as banknotes and coins) that exhibits properties similar to physical currencies, however, allows for instantaneous transactions and borderless transfer-of-ownership.

Both virtual currencies and cryptocurrencies are types of digital currencies, but the converse is incorrect. Like traditional money these currencies may be used to buy physical goods and services. Digital currencies such as bitcoin are known as "decentralized digital currencies," meaning that there is no central point of control over the money supply. (see Wikipedia)

Bitcoin is the first cryptographic-based electronic money, which was invented in 2008. It is also referred as the first cryptocurrency. Bitcoin is not only virtual money, but also a payment system composed of a decentralized peer-to-peer transaction network for recording and verifying the money transactions.

Bitcoins (i.e., units of Bitcoin) are not stored in individual owners' client wallets, but their ownerships are recorded in a public ledger of all Bitcoin transactions, i.e., blockchain, by using Bitcoin addresses of the owners. A Bitcoin address is a 160-bit hash of the public portion of a public/private Elliptic Curve Digital Signature Algorithm (ECDSA) key pair. The private key for each Bitcoin address is stored in the client wallet of the address owner.

Moreover, all client wallets are connected with each other through the Internet and form nodes of a transaction network to relay and verify the transactions. Using public/private-key cryptography, one can "sign" (i.e., use his/her private key) to send an amount of bitcoins recorded at his/her Bitcoin address to another Bitcoin address, and in the transaction network anyone who knows his/her public key can verify whether the signature is valid.

Since the appearance of Bitcoin, there have been different cryptographic-based electronic currencies being created and collectively called alternative cryptocurrencies. Among them, some are modified forms of Bitcoin using different cryptographic hash algorithms (e.g., Litecoin) and/or having additional functions (e.g., CinniCoin), while some are created using different signature technologies (e.g., CryptoNote).

By design, Bitcoin is pseudonymous, while all alternative cryptocurrencies are either pseudonymous or anonymous. For anonymous cryptocurrency, it can be easily applied to money laundering activities because all senders and receivers in money transactions are not traceable. For pseudonymous cryptocurrency, an academic study (Meiklejohn S, et al. University of California, San Diego, 2013) showed that evidence of interactions between institutes could be identified by analyzing the pattern of involvements of Bitcoin addresses in empirical purchasing of goods and services.

This approach may be able to identify illegal activities at institution level, but still not able to narrow down to a single person level. A recent academic study (Koshy P, et al. Pennsylvania State University, 2014) has shown that it is possible to map a Bitcoin address to an IP address. However, this approach is only applicable to less than 10% of the Bitcoin addresses. Therefore, it is generally believed that Bitcoin and other alternative cryptocurrencies can be used for illegal activities such as money laundering (Bryans D, Indiana Law Journal, 89 (1):441, 2014).

The pseudonymous/anonymous property also makes Bitcoin and alternative cryptocurrencies become attractive targets for hackers and thieves. For example, in February 2014, the Mt. Gox company, which was the world largest bitcoin exchange company at that time, was filed for bankruptcy protection because the company was being hacked continuously, resulting in loss of 850,000 bitcoins (worth about US$480 million).

In January 2015, the Slovenian Bitcoin exchange Bitstamp, which was the world's third largest bitcoin exchange at that time, was hacked, and less than 19,000 BTC (worth about US$5 million) was stolen. Although the hackers/thieves must transfer the stolen bitcoins to their Bitcoin addresses, the identities of most of these hackers and thieves remain unknown.

Therefore, there are needed Anti-Theft Solutions for Bitcoin. The ownerships of bitcoins are being protected by private keys, which are stored in users' wallet. Private keys can be created from a passphrase. For example, Brainwallet is a website that provides a tool to generate a Bitcoin address and its private key from the sha256 of a passphrase. Using a password dictionary, one could analyze the Bitcoin blockchain and search for active Bitcoin addresses created from typical passwords, and steal the bitcoins from these addresses using the corresponding private keys.

One simple anti-theft solution is to avoid using Bitcoin addresses generated from typical passphrases. For other Bitcoin addresses, hackers can hack the computers or servers of Bitcoin owners to look for files containing the private key records. Once these files are discovered, bitcoins stored at the corresponding addresses can be easily transferred to another address. The simple solution for this is to keep such files in a cold storage (i.e., a device which is not connected to the Internet), or even not to create such files.

Another way to steal bitcoins is to steal the main wallet data file (i.e., wallet.dat file) in a Bitcoin wallet, which is installed in a computer or server connected to the Internet. Robert Lipovsky (2013) reported an online banking trojan that can steal the wallet.dat files. Private keys are stored in the wallet.dat files and are protected with passphrases. Once the main wallet data file is stolen, the protection passphrase can be cracked by dictionary-based guessing, permutations of dictionary words or pure brute force.

One example of solutions for such stolen Bitcoin wallets is presented in a patent application publication of CN103927656 (A) entitled "Bitcoin terminal wallet with embedded, fixed collecting address and Bitcoin payment method of Bitcoin terminal wallet".

One simple solution, to the above, is to store bitcoins at a multisignature address that require two private keys for spending the bitcoins. One private key is stored in computing device (e.g. local computer), while another key is stored in a separate computing device (e.g. smart phone, remote server), creating two-factor authentication for transactions. Such solution is not yet available until the present invention.

Another solution is to make all Bitcoin senders and receivers identifiable. The legal identities of the thefts or hackers can then be uncovered from revealing the legal identities of owners of the Bitcoin addresses receiving the stolen bitcoins. Such solution is not yet available until the present invention.

Currently Anti-Money Laundering (AML) solutions for Bitcoin are highly demandable. For bitcoin service providing companies to meet U.S. (FinCEN) and worldwide regulations in AML, the current approach is a combined use of know-your-customer (KYC) and transaction monitoring. To make this possible, all traders/customers must provide their legal identities and subjected to verification. However, this approach suffers from two major problems. First, this approach is mainly adopted by companies providing legitimate services. Therefore, AML activities involving bitcoins can still happen worldwide. Second, companies usually have their own customer registration and identity verification systems.

This not only leads to redundancy in resources and high business running cost, but also creates annoyance for bitcoin users. Being an honest bitcoin user, one may need to repeatedly provide identity documents to different bitcoin service providing companies for identity verification before using their services.

On 25 Feb. 2015, Bank of England launched its One Bank Research Agenda—an ambitious and wide-ranging framework to transform the way research is done at the Bank. According to this discussion paper, Bank of England is investigating whether central banks should themselves make use of the Bitcoin's blockchain technology to issue their own digital currencies. Bank of England has stated that issues related to KYC and AML have to be addressed, and should investigate how digital identity management could be achieved while balancing privacy considerations.

Taking into account the foregoing, it would be advantageous to design a personal/client identification and verification process, pseudonymous system and transaction network for monitoring and restricting transactions of cryptography-based electronic money, that would obviate at least some of the aforementioned disadvantages.

The present invention—"legal identity-linked credential authentication protocol" is the first protocol providing a practical solution for the issues related to cryptocurrency theft, KYC and AML, while maintaining user privacy.

Last but not least, the present invention can be adopted or modified by the central banks or other financial institutions, in order to issue their own digital currencies that are supported by a ledger payment system, but also regulated by a central governing body. The ledger can be private or open to the public. Such digital currencies can hence inherit advantages of the existing banking system and advantages of cryptography-based electronic money.

SUMMARY

The invention presented herein can be summarized by the following clauses.

1. A method for personal/client identification and verification for transactions involving cryptography-based electronic money, the method being executed by a computational server (101) comprising at least one computer program functioning as a registration interface (102), and the method being characterized in that it comprises the steps of:

providing access to one or more potential or existing currency users (103);

providing a registration interface (102) for one or more potential currency users to register a user account requiring authentication (104);

requesting the submission of documents for proof of legal identity of a registrant (105);

verifying the legal identity of the registrant (106);

rejecting an account creation for registrants failing in legal identity verification (107);

creating a personal/client account (108) for individual successful registrants (109) with successful verification of legal identity (110);

allowing a successful registrant (109) to create a credential (111) that comprises an associated authentication (112);

storing (116) all the submitted information in a client information database (115);

sending (117) the credential to central approval servers (401); and mapping and storing (118) multisignature currency address(es), credential and legal identity of individual registrants.

2. The method according to clause 1 characterized in that the authentication for accessing a personal/client account is effected by means of a password protection, two factor authentication or multiple factor authentication.

3. The method according to clause 1 characterized in that it further comprises a step of encrypting the credentials (114).

4. The method according to clause 1 characterized in that the credential is a digital, electronic or hardware item which can be used as an authentication mechanism to identify oneself. For example, it can be a unique pair of digital codes (e.g., name and password); it can be a unique product key for activing a client wallet software; and it can be a constantly changing token (e.g. a unique 7-digit code) which is tied to a physical device that is owned by the user, such as a cellphone or a personalized secure key generating device.

5. A method for creating a cryptography-based electronic money (CBEM) (201) and its associated transaction network (202), the method being executed by a network of computer programs functioning as nodes, and the method being characterized in that it comprises the steps of:

installing a node (203), which can be a stand-alone computer program or a functional module of a client wallet (111), in one or more client computers and/or servers (204);

connecting all nodes to form relay nodes (205) of a peer-to-peer network through a data transmission network (206);

controlling the method for creating at least one unit of the CBEM (207); protecting the ownerships of at least one unit of the CBEM by public/private-key cryptography (208);

recording ownerships of at least one unit of the CBEM into a ledger of all transactions (e.g. blockchain) (209) using the owners' currency addresses (313) (210);

verifying ownerships of at least one unit of the CBEM (211);

restricting only valid registered users (109) to generate one or more valid currency addresses (313) to receive at least one unit of the CBEM by verifying the submitted credential (111) with one of the central approval servers (401) (212);

recording transactions of at least one unit of the CBEM into the ledger (209) (213);

verifying transactions of at least one unit of the CBEM (214);

controlling the method for transacting at least one unit of the CBEM (215); incorporating the transaction rules into the programing code of at least one nodes (216);

restricting at least one transaction approval rule (217), comprising at least one of: requisition of a valid credential (111) from the sender, requisition of one or more approval private keys (406) from one of the central approval servers (401);

allowing only creation of multisignature transactions in pay-to-script-hash format or any other compatible format (218);

allowing only creation of multisignature transactions each requiring at least two private keys as signatures (219);

allowing only creation of multisignature transactions in the presence of a valid credential (111) (220);

restricting one of these private keys (219) to be an approval private key (406) from one of the central approval servers (221);

restricting the rest of the private keys (219) to be client private keys (222), which are encrypted and stored in the client wallet(s) (301) (223);

sending all transaction requests from the client wallets (301) to one of the central approval servers (401) to obtain the approval private key for signing the transactions (224); and rejecting all transactions missing any one of the required private keys (219); (225).

6. A method for personal/client identification and verification for transactions involving cryptography-based electronic money, the method being executed by a computer program functioning as a client device of a user, and the method being characterized in that it comprises the steps of:

installing a computer program of a client device to function as a client wallet (301) in at least one computer or computational server (302);

serving as one of the relay nodes (205) for relaying information of all CBEM units (e.g., coins) being generated in the transaction network (202) (303); serving as one of the relay nodes (205) for relaying all transaction information in the transaction network (202) (304);

serving as one of the relay nodes to verify and confirm all transactions that are broadcasted to the transaction network (202) (305);

generating new coins through contributing to recording any new transaction information into the ledger of all transactions (e.g. the blockchain) (209) (306);

generating one or more pairs of cryptographic client public key (307) and client private key (308) for receiving and sending coins (309);

storing the client public-private key pairs (items 307, 308) of one or more currency addresses generated by the currency users (310);

serving as a client wallet for the currency users to receive and send coins; (311);

serving as an client wallet to communicate between one of the central approval servers (401) and registered currency users (109) (312);

only generating (314) currency addresses which are multisignature addresses (313);

generating one of more multisignature addresses (313) from the client public key (307) and the approval public key (405) (315);

only storing one or more multisignature addresses (313) in the client wallet (301) for sending and receiving coins (316);

sending one of more multisignature addresses (313) to the client information database (401) for storage and mapping to legal identity of the owner of the address(es) (317);

sending the generated valid multisignature addresses (313) to the central approval servers (401) for storage (318);

submitting a credential (111) of a valid registered users (109) to one of the central approval servers for obtaining approval to generate one or more valid currency multisignature addresses (313) (319);

submitting a credential (111) of a valid registered users (109) to one of the central approval servers for obtaining approval to create one or more valid transactions (items 218, 219, 220, 221, 223) to send coins to one or more currency addresses (320);

allowing only creation of transactions that use multisignature addresses (313) for both sending and receiving the coins (321); and recording unspent coins (if there is any) into the blockchain at the currency address from where the coins have just been sent (322).

7. A method for personal/client identification and verification for transactions involving cryptography-based electronic money, the method being executed by a computer program in a computational server functioning as a central approval server (401), and the method being characterized in that it comprises the steps of:

communicating (407) with a client wallet (301) to generate one or more valid multisignature currency addresses (313) in the presence of a valid credential;

providing (408) approval public key (405) to the currency wallet to create one or more multisignature addresses (313), communicating (409) with the client wallet (301) to generate one or more valid transactions (218, 219, 220, 221, 223) to send coins to one or more currency address in the presence of a valid credential;

providing (410) approval private key (406), which are corresponding to the approval public key (405) used in creation of the multisignature address (313), to sign transaction input for one or more valid transactions (218, 219, 220, 221, 223);

providing the most recent private key (411) to sign the whole transaction for one or more valid transactions (412); and storing (414) transaction information in a transactions database (413).

8. The method according to clause 7, characterized in that the most recent approval private key (411) is the approval private key corresponding to the approval public key (405) used in creation of the multisignature address (313) or another approval private key.

9. The method according to clause 7 characterized in that the step of storing (414) transaction information in a transactions database (413) includes storing a transaction ID, sender's currency address, receiver's currency address, amount of coins being transacted, transaction time and IP addresses of the sender and the receiver's client wallets.

10. The method according to clause 7, characterized in that the method further comprises a step of verifying the transaction against one or more transaction criteria (501, 502) at the central approval server (401).

11. The method according to clause 7, characterized in that the one or more transaction criteria (501, 502) include criteria predefined by a central governing body (601) and/or the registrant.

12. The method according to clause 7, characterized in that the method further comprises a step of tracing legal identities of the sender and receiver by mapping their currency addresses in the transaction database and the client information database when needed.

13. A method for personal/client identification and verification for transactions involving cryptography-based electronic money, the method being executed by a set of computer programs functioning as devices of a central governing body and a client device of a user, the method being characterized in that it comprises the steps of:

receiving credentials, of a registrant, comprising at least two factor authentication credentials defining a multi-signature;

verifying legal identity of the registrant;

creating a personal/client account (108) for an individual successful registrant (109) with successful verification of legal identity (110) whereas the personal/client account facilitates mapping and storing the multisignature of a currency address and legal identity of individual registrants (118);

providing a registrant wallet comprising at least one unit of electronic money;

recording ownerships of the at least one unit of electronic money into a transactions database (413) using the registrants' currency address (313);

creating a multisignature transaction, in a pay-to-script-hash format or any other compatible format (218), each requiring at least two private keys as approval signatures (219);

restricting one of these private keys (219) to be an approval private key (406) from one of central approval servers (221);

restricting the rest of the private keys (219) to be the registrant's private keys (222), which are stored in the client wallet (301, 223);

sending the transaction request from the client wallet (301) to at least one of the central approval servers (401) in order to obtain the approval private key for signing the transaction (224); and broadcasting the approved transaction messages to all relay nodes in a transaction network (214).

14. A system for personal/client identification and verification for transactions involving cryptography-based electronic money, the system comprising:

a central approval server (401) configured to execute the method according to clause 7 in order to process client registration requests, client cryptocurrency addresses, cryptocurrency transactions;

a client information database (404) communicatively coupled to the central approval server (401);

transactions database (413) communicatively coupled to the central approval server (401);

at least one client device (414, 415) provided with a registrant wallet (416, 417) comprising at least one unit of electronic money;

wherein the at least one client device (414, 415) is configured to execute the method according to clause 13.

15. A computer program comprising program code means for performing all the steps of the computer-implemented method according to clause 1, clause 5, clause 6, clause 7 and clause 13 when said program is run on a computer or computational server.

16. A computer readable medium storing computer-executable instructions performing all the steps of the computer-implemented method according to clause 1, clause 5, clause 6, clause 7 and clause 13 when executed on a computer or computational server.

17. The method of Clause 7, wherein the pair of approval public Key (405) and approval private key (406) can be changed manually or automatically in a regular period to avoid leakage of the approval public key and the approval private key to the public. After changing to a new pair of approval key, the old approval private key will be used for signing the transaction input (410), and the new approval private key will used for signing the whole transaction (i.e., all transaction's data) (412).

18. The methods of clause 5, clause 6 and clause 7, wherein any currency addresses that are not generated through the submission of a valid credential to one of the central approval servers (401) are not valid, and are not able to receive any coins.

19. The method of clause 10, wherein the transaction network (202) can be modified to reject any transactions that do not the meet the central transaction criteria (501) or client transaction criteria (502) stored in one of the central approval servers (401).

20. The method of clause 19, wherein the client transaction criteria (502) can be defined by a valid registered user to limit his/her own transactions.

21. The method of clause 19, wherein the transaction criteria (501) can be defined by a central governing body (601) to stop suspicious transactions that is likely to be involved in illegal activities, such as money laundering.

22. The method of clause 5, wherein individual transactions can be monitored with a defined rules to identify, record and report suspicious transactions that is likely to be involved in illegal activities, such as money laundering.

23. The method of clause 5, wherein legal identities of owners of individual currency addresses are stored in the client information database. For those transactions suspected of illegal activities (clause 22), identities of their associated senders and receivers will be extracted from the client information database by tracing with the currency addresses of the senders and receivers. Subsequently, the suspicious activities and the associated client information will be reported to government agencies with respect to the regulations and laws in the associated countries.

24. The methods of clause 1 and clause 5, wherein legal identities of owners for individual currency addresses are stored in the client information database. This fulfills the "know-your-customer" regulatory requirement. This allows the system to be used as a payment system for commercial activities.

25. The methods of clause 1 and clause 5, wherein legal identities of owners for individual currency addresses are stored in the client information database. However, such information is not accessible to the public, in order to maintain the pseudonymous property of the cryptography-based electronic money (201) and its transaction network (202).

26. The methods of clause 1 and clause 5, wherein a user can change his/her credential (111) to stop coins being transferred out from a stolen main data file (e.g., wallet.dat file) of his/her currency wallet (301).

27. The methods of clause 1, clause 5, clause 6 and clause 12, wherein (i) legal identities of owners for individual currency addresses are stored in the client information database, (ii) any currency addresses that are not generated through the submission of a valid credential to one of the central approval servers (401) are not valid, and are not able to receive any coins (clause 18), and (iii) only valid registered users have a valid credential (112). When coins are stolen from someone, the theft(s) or the hacker(s) can be easily traced by retrieving legal identity(s) of the receiver(s) from the client information database according to the currency address(es) of the receiver(s). Therefore, the implementation of the methods of clause 1, clause 6 and clause 7 prevents a cryptocurrency from being stolen.

28. The methods of clause 5, clause 6 and clause 12, wherein the amount of coins own by a valid registered user are completely and easily traceable and trackable by the central governing body (601) through analyzing the transaction records in the transactions database (413). Besides the capability of linking individual currency addresses to their owners, this unique property is contributed by recording unspent coins (if there is any) at the currency address from where the coins have just been sent/spent (322). This unique property allows applications of our system to financial and banking activities, particularly those required third-party auditing.

29. The methods of Clause 20 and Clause 21, wherein, provide a practical solution for the issues related to cryptocurrency theft, KYC and AML, while maintaining user privacy.

30. The systems of Clause 20 and Clause 21, wherein, can be adopted or modified by the central banks or other financial institutions to issue their own digital currencies that are supported by a distributed ledger payment system, but also regulated by a central governing body.

Further, there is disclosed a method involving a system for creating a new cryptography-based electronic money or cryptocurrency with the traceable legal identities of senders and receivers in all money transaction. The method may be performed in a system comprising:

1. At least one server and at least one web-based registration interface, wherein the at least one server performs at least some, or all, of the following functions:

Providing access to one or more potential or existing currency users;

Providing an online interface for one or more potential currency users to register a user account with password protection, two factor authentication or multiple factor authentication;

Requesting the submission of documents for proof of the legal identity of a registrant;

Handling the verification of the legal identity of the registrant;

Rejection of an account creation for registrants failing in legal identity verification;

Creating of a personal/client account for individual successful registrants with successful verification of legal identity;

Allowing a successful registrant to create a credential that comprises a label and a password;

Allowing a successful registrant to change the credential and contact information;

Encrypting the credential;

Storing all the submitted information, particularly the legal identity and the encrypted credential, in a client information database;

Sending the encrypted credential, which is newly generated or changed, to central approval servers;

Mapping and storing multisignature currency address(es), credential and legal identity of individual registrants.

One cryptography-based electronic money and its associated transaction network, wherein it performs at least some, or all of the following basic functions and unique functions:

1. Basic functions—common to those of all other cryptography-based electronic money Providing client wallet software to public;

Connecting computers or servers through the client wallets;

Using the connected computers or servers to form relay nodes of a transaction network;

Generating a predefined amount of money units (coins) at a predefined speed;

Protecting the ownerships of the coins by public/private-key cryptography;

Recording the ownerships of the coins into a ledger of all transactions (e.g. blockchain) using the owners' currency addresses;

Distributing the ledger of all transactions (e.g. blockchain) and its updates to people who are connected to the transaction network through the client wallet;

Allowing a private key owner to send an amount of coins only without exceeding an amount of coins recorded at the corresponding currency address after reduction of the required transaction fee;

Broadcasting all new transaction messages to all relay nodes in the transaction network;

Verifying all new transaction messages at individual relay nodes;

Recording the transaction information (including but not limited to sender currency address, receiver currency address, amount of coins being transacted, transaction fee, transaction time) into the ledger of all transactions (e.g., the blockchain);

2. Unique functions

Restricting only valid registered users to generate one or more valid currency addresses to receive the coins by verifying the submitted credential with one of the central approval servers;

Allowing only creation of multisignature transactions in pay-to-script-hash format or any other compatible format;

Allowing only creation of multisignature transactions each requiring at least two private keys as signatures;

Allowing only creation of multisignature transactions in the presence of a valid credential;

Restricting one of these private keys to be an approval private key from one of the central approval servers;

Restricting the rest of the private keys to be client private keys, which are encrypted and stored in the client wallet(s);

Sending all transaction requests from the client wallets to one of the central approval servers to obtain the approval private key for signing the transactions;

Rejecting all transactions missing any one of the required private keys;

Restricting transaction approval rules (including but not limited to requisition of a valid credential from the sender, requisition of one or more approval private keys from one of the central approval servers for signing transaction input and for signing whole transaction) for individual transactions by using a "pay-to-script-hash" script or any other compatible script that is built inside the source of the electronic money as the only script for transaction creation;

At least one computer or server for running client wallet software, wherein the at least one client wallet performs at least some, or all of the following basic functions and unique functions:

1. Basic functions—common to those of all other cryptography-based electronic money Serving as one of the relay nodes for relaying all transaction information in the transaction network;

Serving as one of the relay nodes to verify and confirm all transactions that are broadcasted to the transaction network;

Generating new coins through contributing to recording any new transaction information into the ledger of all transactions (e.g. the blockchain);

Generating one or more pairs of cryptographic client public key and client private key for receiving and sending coins;

Storing the client public-private key pairs of one or more currency addresses generated by the currency users;

Serving as a client wallet for the currency users to receive and send coins;

2. Unique functions

Serving as an client wallet to communicate between one of the central approval servers and registered currency users;

Only generating currency addresses which are multisignature addresses;

Generating one of more multisignature addresses from the client public key and the approval public key;

Only storing one or more multisignature addresses in the client wallet for sending and receiving coins;

Sending one of more multisignature addresses to the client information database for storage and mapping to legal identity of the owner of the address(es);

Sending the generated valid multisignature addresses to the central approval servers for storage;

Submitting a credential of a valid registered users to one of the central approval servers for obtaining approval to generate one or more valid currency multisignature addresses;

Submitting a credential of a valid registered users to one of the central approval servers for obtaining approval to create one or more valid transactions to send coins to one or more currency addresses;

Allowing only creation of transactions that use multisignature addresses for both sending and receiving the coins Recording unspent coins (if there is any) into the blockchain at the currency address from where the coins have just been sent;

At least one central approval server, wherein the at least one central approval server performs at least some, or all, of the following functions:

1. Retrieving new or updated credentials and their associated currency addresses from the client information database;

2. Storing and updating users' credentials and their associated currency addresses in the central approval database;

3. Generating, changing, encrypting and storing one or more pairs of approval public key and approval private key.

4. Communicating with the client wallet to generate one or more valid multisignature currency addresses in the presence of a valid credential;

5. Providing approval public key to the currency wallet to create one or more multisignature addresses, 6. Communicating with the client wallet to generate one or more valid transactions to send coins to one or more currency address in the presence of a valid credential;

7. Providing approval private key, which are corresponding to the approval public key used in creation of the multisignature address, to sign transaction input for one or more valid transactions.

8. Providing another approval private key, which can be the approval private key used in item 410 or the most recent approval private key, to sign the whole transaction for one or more valid transactions.

9. Storing all transaction information (including but not limited to transaction ID, sender currency address, receiver currency address, amount of coins being transacted, transaction fee, transaction time and IP addresses of sender and receiver's client wallets) in a transaction database.

Further, there is disclosed a method for personal/client identification and verification for transactions involving cryptography-based electronic money, the method comprising at least some, or all, of the steps of:

1. Verifying legal identity of a registrant;

2. creating a personal/client account, protected by at least two-factor authentication, for an individual successful registrant with successful verification of legal identity whereas the personal/client account facilitates mapping and storing individual registrants' legal identity and currency address(es) with the personal/client account;

3. receiving a credential, of an individual successful registrant, defining identity of the registrant, ownership of a currency address and sender identity of a transaction;

4. storing the registrant's legal identity and credential in one or more central approval servers;

5. providing a registrant wallet for sending and receiving at least one unit of electronic money;

6. recording ownership of at least one unit of electronic money into a ledger of all transactions (e.g. blockchain) using the registrant's currency address(es);

7. receiving and verifying a credential, which is submitted from a registrant wallet under a request for generation of a currency address, at a central approval server;

8. approving the creation of a multisignature address as a valid currency address belonging to the registrant, by providing an approval public key from the central approval server to the registrant wallet;

9. generating a valid currency address for receiving at least one unit of electronic money by combing the registrant's public key and the central approval server's approval public key at the registrant wallet;

10. storing and mapping the registrant's legal identity, credential, one or more valid currency addresses in a client information database;

11. creating a transaction, in a "pay-to-script-hash" format or any other compatible format, each requiring at least two private keys as signatures at the registrant wallet;

12. restricting at least one of these private keys to be an approval private key from one of central approval servers;

13. restricting the rest of the private keys to be the registrants' private keys, which are stored in the client wallets;

14. restricting transaction approval rules (including but not limited to requisition of a valid credential from the sender, requisition of one or more approval private keys from one of the central approval servers for signing transaction input and for signing whole transaction) for individual transactions by using a "pay-to-script-hash" script or any other compatible script that is built inside the source of the electronic money as the only script for transaction creation;

15. receiving and verifying a credential, which is submitted from a registrant wallet under a request for creation of a transaction, at a central approval server;

16. verifying the transaction against one or more transaction criteria (including but not limited to those are predefined by the central governing body and/or the registrant) at the central approval server;

17. approving the execution of the transaction by signing the transaction with one or more private keys at the registrant wallet(s) and by signing the transaction with one or more the approval private keys at the central approval server;

18. recording the transaction message in the ledger of all transactions (e.g. blockchain);

19. storing the transaction information (including but not limited to transaction ID, sender and receiver's cryptocurrency addresses, amount of money transacted, time of transaction and IP addresses of sender and receiver's client wallets) in a transaction database;

20. broadcasting the signed transaction message to all relay nodes in a transaction network for confirmation;

21. tracing legal identities of the sender and receiver by mapping their currency addresses in the transaction database and the client information database when needed.

The systems and methods described above may be modified to require two or more approval private keys from more than one independent central governing bodies for approving the transactions. Such modified electronic money and its associated payment network will have a higher degree of regulation and governance.

The systems and methods described above may be modified to use single-signature addresses which are only signed by a single user or multisignature addresses which are signed by two or more users for receiving and sending electronic money without requiring any approval private key from the central governing body for approving the transactions. However, such modified electronic money and its associated payment network are more susceptible to hacking to override the regulation by the central governing body.

The systems and methods described above may be modified to use a single-signature addresses which are only signed by a central governing body or multisignature addresses which are signed by two or more central governing bodies for receiving and sending electronic money without requiring any private key from a user for approving the transactions. However, users will have less protection on ownership of their electronic money. Validity of such modified electronic money and its associated payment network will depend on the trust and honesty of the central governing body(ies).

The systems and methods described above may have at least some or all of the following preferable features.

Preferably, the pair of approval public Key and approval private key can be changed manually or automatically in a regular period to avoid leakage of the approval public key and the approval private key to the public. After changing to a new pair of approval key, the old approval private key will be used for signing the transaction input, and the new approval private key will used for signing the whole transaction (i.e., all transaction's data).

Preferably, any currency addresses that are not generated through the submission of a valid credential to one of the central approval servers are not valid, and are not able to receive any coins.

Preferably, the transaction network can be modified to reject any transactions that do not the meet the central transaction criteria stored in one of the central approval servers.

Preferably, the client transaction criteria can be defined by a valid registered user to limit his/her own transactions.

Preferably, the transaction criteria can be defined by a central governing body to stop suspicious transactions that is likely to be involved in illegal activities, such as money laundering.

Preferably, individual transactions can be monitored with a defined rules to identify, record and report suspicious transactions that is likely to be involved in illegal activities, such as money laundering.

Preferably, legal identities of owners of individual currency addresses are stored in the client information database. For those transactions suspected of illegal activities, identities of their associated senders and receivers will be extracted from the client information database by tracing with the currency addresses of the senders and receivers. Subsequently, the suspicious activities and the associated client information will be reported to government agencies with respect to the regulations and laws in the associated countries.

Preferably, legal identities of owners for individual currency addresses are stored in the client information database. This fulfills the "know-your-customer" regulatory requirement. This allows the system to be used as a payment system for commercial activities.

Preferably, legal identities of owners for individual currency addresses are stored in the client information database. However, such information is not accessible to the public, in order to maintain the pseudonymous property of the cryptography-based electronic money and its transaction network.

Preferably, a user can change his/her credential to stop coins being transferred out from a stolen main data file (e.g., wallet.dat file) of his/her currency wallet. Preferably, (i) legal identities of owners for individual currency addresses are stored in the client information database, (ii) any currency addresses that are not generated through the submission of a valid credential to one of the central approval servers are not valid, and are not able to receive any coins, and only valid registered users have a valid credential. When coins are stolen from someone, the theft(s) or the hacker(s) can be easily traced by retrieving legal identity(s) of the receiver(s) from the client information database. Therefore, the implementation of the system prevents a cryptocurrency from being stolen.

Preferably, the amount of coins own by a valid registered user are completely and easily traceable and trackable by the central governing body through analyzing the transaction records in the transaction database. Besides the capability of linking individual currency addresses to their owners, this unique property is contributed by recording unspent coins (if there is any) at the currency address from where the coins have just been sent/spent. This unique property allows applications of our system to financial and banking activities, particularly those required third-party auditing.

Preferably, the systems provide a practical solution for the issues related to cryptocurrency theft, KYC and AML, while maintaining user privacy.

Preferably, the systems can be adopted or modified by the central banks or other financial institutions to issue their own digital currencies that are supported by a distributed ledger payment system, but also regulated by a central governing body.

BRIEF DESCRIPTION OF THE DRAWINGS

These and other objects of the invention presented herein, are accomplished by providing a system and method for personal/client identification and verification. Further details and features of the present invention, its nature and various advantages will become more apparent from the following detailed description of the preferred embodiments shown in a drawing, in which.

NOTATION AND NOMENCLATURE

Figure 1:
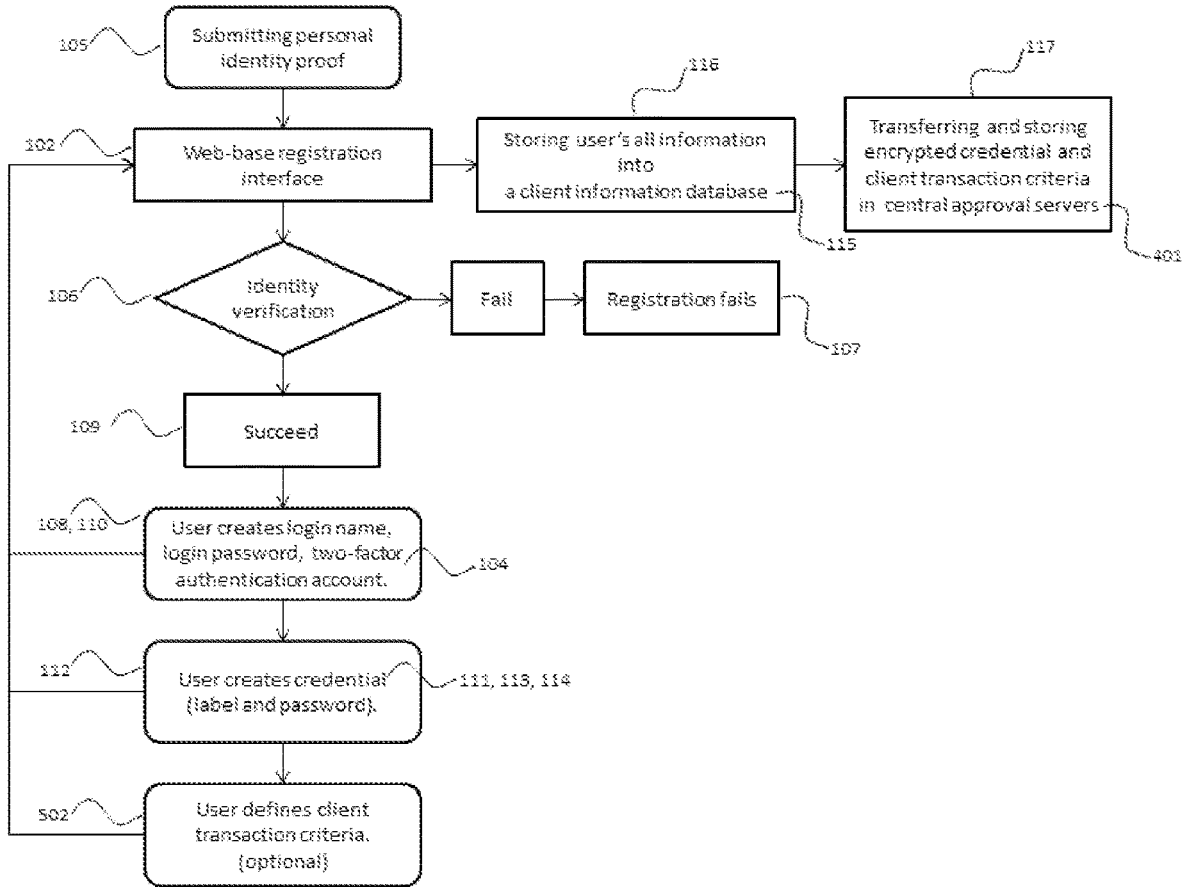
FIG. 1 presents a registration and database system for capturing, verifying and storing legal identity of a new user for a cryptography-based electronic money.

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

The present invention relates to technical fields of cryptographic-based electronic money (CBEM), such as alternative cryptocurrency, and transaction systems. More specifically, the present invention relates to a method and system for creating of a new CBEM and its associated payment system that allows disclosure of the legal identities of senders and receivers in all money transactions, while maintaining the pseudonymous property of the CBEM.

The present invention allows inclusions of additional modules for monitoring all transactions and identifying those potentially related to illegal activities, and for including criteria, which are defined by a central governing body or CBEM users, to regulate or limit transactions.

As a result, the present invention provides a practical solution for the issues related to cryptocurrency theft, KYC and AML, while maintaining user privacy.

Moreover, the present invention can be adopted or modified by the central banks or other financial institutions to issue their own digital currencies that are supported by a distributed ledger payment system, but also regulated by a central governing body.

To this end, the present invention involves an integration of three major processes, including (i) legal identity verification, (ii) credential authentication and (iii) a two-party signature scheme. Embodiments of the present invention may provide systems and methods for creation of a CBEM and its associated payment system that allows a central governing body to reveal legal identities of senders and receivers in any money transactions, while maintaining the pseudonymous property of the CBEM.

The credential authentication mechanism of the present invention allows a user to change the credential to stop coins being transferred out from a stolen wallet. Last and not least, as senders and receivers of all transactions can be revealed, the theft(s) or the hacker(s) who has stolen the coins can be easily traced by retrieving legal identity(s) of the receiver(s) from the client information database. As a result, the embodiments of the present invention can prevent CBEM coins from being stolen.

To be able to reveal legal identities of senders and receivers of all transactions of a CBEM, it requires the following two key elements:

1. legal identities of all receivers and senders of a CBEM;
2. prohibition of anonymous people to receive and send coins of a CBEM;

These two key elements can be obtained by allowing only registered users with a verified legal identity to receive and send a CBEM. For capturing and verification of legal identities, a web-based registration interface is created for individual registrants to submit information to provide and prove his/her legal identity, and only those people with a successfully verified legal identity are accepted as valid users. They can then receive and send the CBEM. However, the major difficulty is how to prohibit anonymous people to receive and send coins of a CBEM, particularly open-source CBEM.

CBEMs, such as Bitcoin, are designed to be a decentralized payment system. Their computer programming codes are expected to be available for perusal by anyone at the open source online community. When a CBEM is open source, anyone can use the source code to create his/her currency address to receive and send the coins. Therefore, the KYC registration approach can only be applied to specific service providers, but not to all the coin users.

In order to restrict the coin usage to only registered users, a new method has been developed to differentiate currency addresses generated by registered non-anonymous users (i.e., valid currency addresses) from those generated by non-registered anonymous users (i.e., invalid currency addresses), and another method has been developed to only allow those valid currency addresses to be used for receiving and sending coins.

The present invention provides a practical solution for these two tasks through an integration of three major processes, including (i) legal identity verification, (ii) credential authentication and (iii) a two-party signature scheme. Such integration requires technical changes in:

1. modifying Bitcoin's multisignature transaction protocol;
2. linking it to a client information database;
3. making it as the compulsory transaction protocol, and
4. forcing one transaction signature to be a private key from one of the central approval servers.

The embodiments of the present invention may be achieved by the following key steps:

Step 1: Setting up a computer server and a web-based interface for capturing, verification and storage of legal identities of users and for creating user-specific credentials;

Step 2: Using the web-based interface to create credentials for regulating the process of currency address generation;

Step 3: Using a multisignature approach for receiving and sending coins; and

Step 4: Enforcing pay-to-script-hash transactions regulated by specific rules.

The aforementioned steps will now be described in more details.

Step 1: Setting Up a Computer Server and a Web-Based Interface for Capturing, Verification and Storage of Legal Identities of Users and for Creating User-Specific Credentials The step of setting up a computer server and a web-based interface (e.g. BGCwallet.com) concerns users of a CBEM (e.g. Aten Coin). In the process of registration, a person should provide document/information about his/her legal identity (e.g. passport ID number and copy of identity page of his/her passport), and go through a process to verify his/her legal identity (e.g. identity verification service from MiiCard or IDchecker). A successful registration requires a successful verification of his/her legal identity. All the provided information will be stored in a client information database.

FIG. 1 presents a registration and database system for capturing, verifying and storing legal identity of a new user for a cryptography-based electronic money.

At least one server comprising at least one web-based registration interface (102), performs the following functions. First, at step (105) there is requested, via the web-based registration interface (102), a submission of documents for proof of the legal identity of a registrant. Next, at step (106) there is handled the verification of the legal identity of the registrant. An unsuccessful verification leads to a registration fail (107). Alternatively, a successful registrant (109) is allowed to create two factor authentication or multiple factor authentication (104) to prevent unauthorized access to his/her registered user account and malicious attack.

Two-factor authentication is a secure way to protect online user account (104). It works by requiring a user to identify oneself using two different things when he/she logs into his/her online account. The first authentication thing is a pair of login name and login password created by the user; the second authentication thing is a constantly changing token (e.g. a unique 7-digit code) which is tied to a physical device that is owned by the user, such as a cellphone or a personalized secure key generating device. Then, such online user account cannot be hacked without stealing the personal physical device. Multiple-factor authentication can also be possible by requiring a user to identify oneself using three or more different things when he/she logs into his/her online account (e.g. a pair of login name and login password, a cellphone and a smart identity card).

Figure 2:
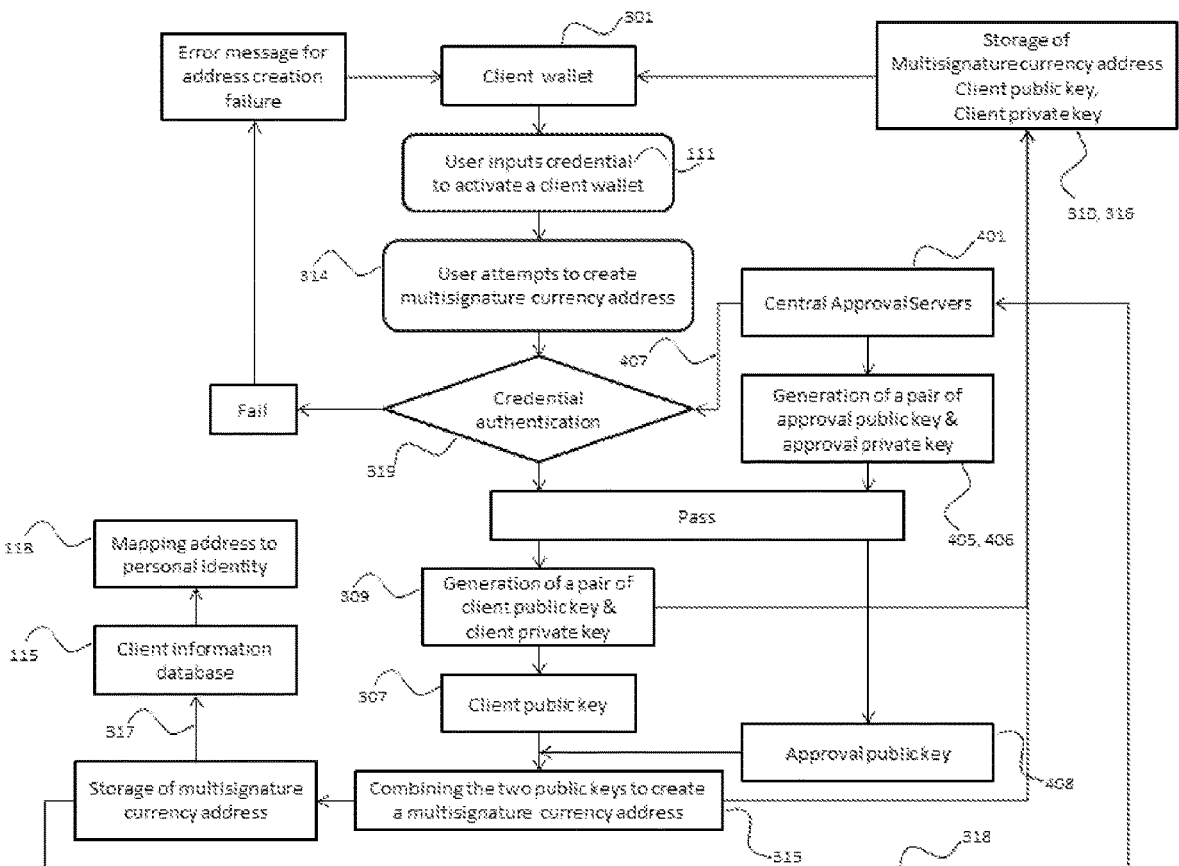
FIG. 2 depicts a legal identity-linked credential authentication system for generation of a multisignature currency address for receiving and sending a cryptography-based electronic money.
Figure 3:
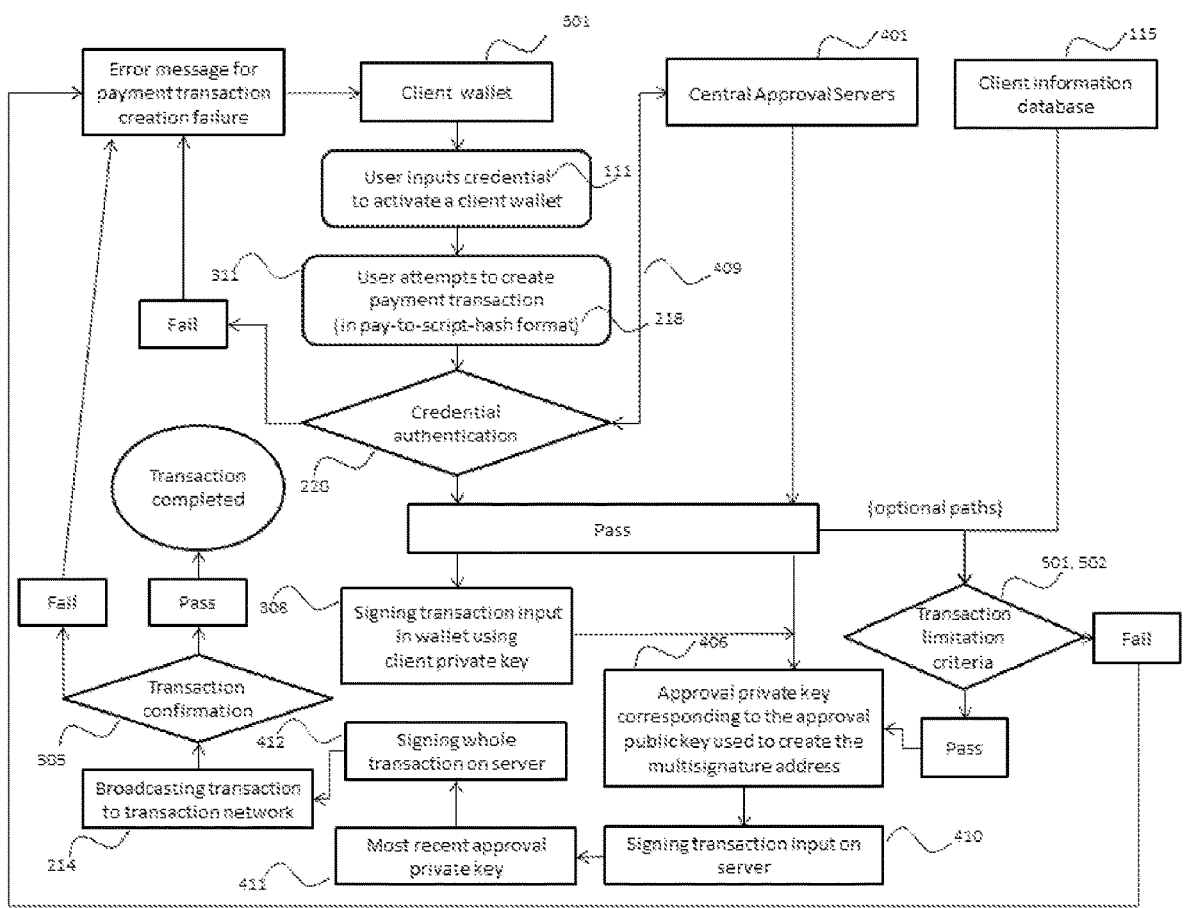
FIG. 3 shows a legal identity-linked credential authentication system and the two-party signature scheme for generation of a payment transaction of an amount of coins which are owned by a user and recorded at a multisignature address.

A successful registrant (109) is required to create a credential (111) that comprises a label and a password (112). Naturally a successful registrant (109) is allowed to change the credential and contact information (113), all of which are preferably encrypted at step (114). The credential is required for a user to generate his/her multisignature wallet address(es) (FIG. 2) for receiving coins (e.g. atencoins), and for creating transactions (FIG. 3).

Optionally, at step 502, there may be defined, client transaction criteria, by a valid registered user to limit his/her own transactions. For example, a user can set a criterion that limits the maximum amount of coins being sent out from his/her currency address(es) within 24 hours. This can minimize the loss of his/her coins when his/her currency wallet is being stolen or hacked.

When the above are completed, at step (116) there is executed storing all the submitted information, particularly the legal identity and the encrypted credential, in the client information database (115).

Finally, at step 117 there is executed sending of the encrypted credential, which is newly generated or changed, to central approval servers (401). The central approval servers execute mapping and storing multisignature currency address(es), credential and legal identity of individual registrants (118). For example, a multisignature currency address is a unique string of 34 characters composed of numerical numbers, small and large alphabet letters (e.g. Aj8xFozUjo3GoNvi95kABpTjO2qQReZo5P); person identity is composed of (i) a full legal name printed on the user's national identity card or passport, (ii) national identity card/passport number and (iii) date of birth.

Step 2: Using the Web-Based Interface to Create Credentials for Regulating the Process of Currency Address Generation Using the web-based interface, only a valid registered user (106, 109) can generate a credential (111) (FIG. 1, 112), which is required for generating his/her multisignature address(es) (as shown in FIG. 2) for receiving and sending coins (e.g. atencoins) (as shown in FIG. 3). The use of credentials prohibits non-registered, anonymous users to generate any valid multisignature addresses to receive and send coins in the system. In other words, all valid currency addresses, for sending or receiving coins of a CBEM, are linked to real people with known, legal identities.

Step 3: Using a Multisignature Approach for Receiving and Sending Coins

By design, one approval public key from one of the central approval servers and at least one client public key are required to generate valid multisignature addresses for receiving and sending coins (FIG. 2). Before one can use the client wallet (301) to generate an address to receive coins, he/she must have input his/her credential (111) into the client wallet. In the process of address generation, the client wallet will first submit the credential to one of the central approval servers (401) through an electronic/digital data transmission network (e.g. the Internet) for validation (407).

After checking the credential is valid, i.e., successful matching to a valid and active credential in the database of the central approval servers (319, 401, 407), the central approval server will provide the approval public key (408) to the client wallet through the electronic/digital data transmission network. If the credential is found to be invalid or inactive, the central approval server will return a failure message to the client wallet. After receiving the approval public key, the client wallet will proceed to generate a multisignature address (315).

After receiving the failure message, the client wallet will stop to the process of multisignature address generation. In the presence of the approval public key, the client wallet generates (309) a pair of client public key (307) and private key (308) and stores (310) in the client wallet, and subsequently combines the approval public key (405) and the client public key (307) to create a multisignature address (315), which hence is closely linked to the approval private key and the client private key. The multisignature address is stored and displayed in the client wallet (316). The user can use the multisignature address to receive coins of a CBEM (e.g. atencoins).

The presence of the approval public key in each multisignature address dictates that all transactions have to obtain both the approval signature (i.e., the approval private key (406)) from one of the central approval servers and the client signature (i.e., the client private key (308)) for conferring validity.

Using this control system, only valid registered users can generate multisignature addresses. These addresses can then be used to make transactions that need to be counter-signed by one of the central approval servers.

FIG. 2 depicts a legal identity-linked credential authentication system for generation of a multisignature currency address for receiving and sending a cryptography-based electronic money.

The process starts from step (301) with providing client wallet, which is a network resource preferably accessible as a software. Next, the input user credentials, from step (111), are applied in order to activate a client's wallet. Subsequently, at step (314), a user attempts to create a currency address wherein the system only generates currency addresses which are multisignature addresses.

Next, at step (319), there is executed submitting a credential, of valid registered users, to one of the central approval servers (401) for obtaining approval to generate one or more valid currency multisignature addresses.

In case of a failure of approval, an appropriate error message may be generated. Otherwise, in case of approval, there is executed, at step (309), generating one or more pairs of cryptographic client public key (307) and client private key (308) for receiving and sending coins. These client public key and client private key are stored and associated with the client's wallet (310). In case of approval, there is also executed, at step 408, providing an approval public key (405), which is mathematically linked to an approval private key (406), from the central approval server to the client wallet.

Further, at step (315), there is executed generating one of more multisignature addresses from the client public key(s) (307) and the approval public key(s) (405). The generated multisignature currency address is stored and associated with the client's wallet (316).

Subsequently, at step (317), there is executed sending one of more multisignature addresses to the client information database (115), for storage and mapping to legal identity of the owner of the address(es) (118).

Step 4: Enforcing Pay-to-Script-Hash Transactions Regulated by Specific Rules

Bitcoin developers have currently created two different methods for creating and approving Bitcoin transactions using different scriptSig/scriptPubKey pairs. The two methods are pay-to-pubkey-hash and pay-to-script-hash.

The pay-to-pubkey-hash is the most commonly used method in daily Bitcoin transactions. In a pay-to-pubkey-hash transaction, a Bitcoin address is a 160-bit hash of the public portion of a public/private Elliptic Curve Digital Signature Algorithm (ECDSA) key pair, and a Bitcoin sender provides a Bitcoin address in scriptPubKey. In a pay-to-pubkey hash transaction, a sender transfers bitcoins directly to an owner of a public key.

In order to initiate a pay-to-pubkey hash transaction, the sender needs to provide a public key of which bitcoins are stored at the corresponding Bitcoin address and the corresponding signature (i.e., a paired private key), as well as a Bitcoin address for receiving the bitcoins. The receiving Bitcoin address is directly linked its corresponding pubic key and signature. When redeeming coins that have been sent to the Bitcoin address, the recipient provides both the signature and the public key. The script verifies that the provided public key does hash to the hash in scriptPubKey, and then it also checks the signature against the public key.

Addresses associated with pay-to-script transactions are hashes of scripts instead of a public key hash. To spend bitcoins through pay-to-script-hash, the process requires provision of a script matching the script hash and data which makes the script evaluate to true. In other words, one has to provide an input (i.e., an answer) to the script in question that the script accepts, and the transaction proceeds. If the input is invalid and the script will not be accepted, resulting in stoppage of the transaction.

Using pay-to-script-hash, one can send bitcoins to an address that is secured in various unusual ways without knowing anything about the details of how the security is set up. For example, the recipient might need the signatures of several people to receive bitcoins stored at a particular Bitcoin address, or a password might be required, or the requirements could be completely unique. For Bitcoin and all other current cryptocurrencies developed on the basis of the Bitcoin technology, pay-to-script-hash is not compulsory.

The pay-to-pubkey-hash is the standard method in Bitcoin transactions as well as in the transactions for all other current cryptocurrencies based on the Bitcoin technology. The pay-to-script-hash function is built into client wallet software of a cryptocurrency. A cryptocurrency owner can use the client wallet software to choose to use pay-to-pubkey-hash or pay-to-script-hash to create transactions.

According to the present invention, only pay-to-script-hash transactions are allowed in the CBEM transaction network. In contrast to Bitcoin and all other current cryptocurrencies based on the Bitcoin technology, this restriction is implemented inside the source codes of the CBEM, instead of only inside the source code of the client wallet software. In such way, a CBEM developer can enforce specific rules in all transactions, and this allows an implementation of a legal identity-linked credential authentication system to control all transactions. The legal identity-linked credential authentication system involves the use of user-specific credentials and multisignature addresses for receiving and sending the CBEM.

In the legal identity-linked credential authentication system, only multisignature addresses are used in the pay-to-script-hash transactions for receiving and sending the CBEM. Each client multisignature address is linked to a script that includes a client pubic key (that is generated from the client wallet) (307) and an approval public key (that is generated from one of the central approval server) (405) for create and signing transactions. Hence, every pay-to-script-hash transactions require at least a client private key (308) and an approval private key (406) to make the transaction valid.

The script for pay-to-script-hash transactions is implemented inside the source codes of the CBEM, instead of only inside the client wallets. This allows the script to enforce the requirement of one or more approval private keys (406) from one or more central approval servers to initializing and signing all transactions. Because provision of the approval private keys can be regulated through the central approval servers, no one can create any pay-to-pubkey-hash or pay-to-script-hash transaction that can bypass the requirements, regulations and/or rules that are predefined at the central approval servers.

FIG. 3 shows a legal identity-linked credential authentication system and the two-party signature scheme for generation of a payment transaction of an amount of coins which are owned by a user and recorded at a multisignature address.

To create a pay-to-script-hash transaction (218), a client's wallet (301) requires a signature (i.e., an approval private key) (406) from a one of the central approval servers (401) to get permission. This request is sent with an API call to the central approval servers for authentication (220). In case of a failure of authentication, an appropriate error message may be generated.

If the credential submitted by the client wallet to the central approval servers (401) is valid (220, 409) and that requested transaction is not considered as suspicious according to predefined criteria (501, 502), it gets the signature from the client wallet (i.e., the client private key) (308) and the signatures (i.e., the approval private key(s)) (406, 411) from one of the central approval servers to approve the transaction (410, 412).

The script of a pay-to-script hash can be modified to require more than one client public key and/or approval private key, resulting in payment transactions requiring more than one signature from one or more clients (either senders or receivers) and/or from one or more approval agencies in order to proceed a transaction. Furthermore, to increase the security, two different approval private keys can be used for signing transaction input (410) and for signing whole transaction (412).

The present invention enforces all transactions requiring at least one approval private key from a central approval server as a signature in order to proceed a transaction. Moreover, the provision of approval private keys require a successfully validation of a valid credential provided by the sender. Because all valid credentials are linked to individual client wallet addresses and owned by registered users, of whom legal identities have been verified and stored in the client information database (FIG. 2). In such way, only a registered user with his/her legal identity stored in the database can transfer any coins from his/her wallet addresses to other wallet addresses upon submission of a valid credential.

The credential provides a link for a central governing body owning the central approval servers and the client information database to uncover the legal identity of a CBEM sender or receiver when necessary. Because information of legal identity is not required in the whole process of a pay-to-script-hash transaction, the sender and receiver remains pseudonymous.

A central approval server may reject any transactions that do not the meet central transaction criteria (501) stored in at least one of the central approval servers (401). In particular, individual transactions can be monitored with predefined rules to identify, record and report suspicious transactions that is likely to be involved in illegal activities, such as money laundering. Any suspicious transactions and identities of the associated senders and receivers can be reported to the relevant government agencies for further action. The invention hence provides a practical solution for the current KYC/AML incompliance issues for Bitcoin and various alternative currencies.

Optionally, at step 502, there may be defined, client transaction criteria, by a valid registered user to limit his/her own transactions. For example, a user can set a criterion that limits the maximum amount of coins being sent out from his/her currency address(es) within 24 hours. This can minimize the loss of his/her coins when his/her currency wallet is being stolen or hacked.

The transaction is then broadcasted to the network of nodes (214) for confirmation (305). After a transaction is generated, it is sent to transaction network for processing and has to be included in a block of the blockchain before becoming legitimate. Nodes accept the block only if all transactions in it are valid (i.e., properly signed) and not already spent. Nodes express their acceptance of the block by working on creating the next block in the chain, using the hash of the accepted block as the previous hash.

The process of implementing a transaction in a newly created block is called a transaction confirmation. Inclusion in one block is considered as one confirmation. When there are confirmations equal to or more than a predefined number (e.g. 6 in the case of Bitcoin, 10 in the case of Aten Coin), the transaction is considered confirmed. In the Bitcoin technology, this feature is introduced in order to protect the system form repeated spending of the same coins (i.e., double-spending).

The unique functions of the arrangement presented in FIG. 1-FIG. 3 are:

Allowing only creation of multisignature addresses (313) as valid currency addresses; (314)

Allowing only creation of transactions that use multisignature addresses (313) for both sending and receiving the coins; (321)

Allowing only creation of transactions in pay-to-script-hash format or any other compatible format (218); (311) Allowing only creation of transactions each requiring at least two private keys as signatures; (308, 406)

Restricting one of these private keys (308, 406) to be an approval private key (406) from one of the central approval servers (401);

Restricting the rest of the private keys (308, 406) to be client private keys (308), which are encrypted and stored in the client wallet(s) (301);

Restricting only valid registered users (109) to create valid credentials (111); (112)

Restricting only users who have a valid credential (111) to generate one or more valid multisignature currency addresses (313) to receive the coins by verifying the submitted credential (111) through one of the central approval servers (401); (319, 407)

Restricting only users who have a valid credential (111), one or more valid multisignature currency addresses (313) and the corresponding client private keys (308, 309) to create one or more valid transactions; (220, 320, 409)

Restricting only users who have a valid credential (111) to receive one or more approval private keys (406, 411) from one of the central approval servers (401) for signing one or more transactions (410, 412) by verifying (220, 320, 409) the submitted credential (111) through one of the central approval servers (401);

Restricting only users who have received one or more approval private keys (406, 411) from one of the central approval servers (401) to create valid transactions by verifying (220, 320, 409) the submitted credential (111) through one of the central approval servers (401), and hence restricting only users who have a valid credential (111) to create valid transactions;

Linking individual credentials (111, 112, 113, 114) to users' legal identities (105); (FIG. 1)

Using individual credentials (FIG. 1, 111) to trace their owners' legal identities (105); (116)

Linking individual multisignature addresses (313, 314) to users' credentials (111); (FIG. 2)

Using individual multisignature addresses (313) to trace (118) credentials (111) of their owners (FIG. 2), and hence using the credentials (111) to trace (116) legal identities (105) of the owners (FIG. 1);

Using individual transactions to trace multisignature addresses (313) of senders and receivers (FIG. 3), subsequently using the multisignature addresses (313) to trace (118) credentials (111) of the senders and receivers (FIG. 2), and finally using the credentials (FIG. 1, 111) to trace (116) legal identities (105) of the senders and receivers;

Allowing tracing and tracking (116) legal identities of senders (FIG. 1, 105) and receivers in all valid transactions (FIG. 3) because only users who have a valid credential (111) can create valid multisignature addresses (FIG. 2) and create valid transactions (FIG. 3).

In some implementations, the methods described in connection with FIG. 1, FIG. 2, and/or FIG. 3 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method in response to instructions stored electronically on an electronic storage medium. The one or more processing devices may include one or more devices configured through hardware, firmware, and/or software to be specifically designed for execution of one or more of the operations of the method(s) illustrated in FIG. 1, FIG. 2, and/or FIG. 3.

Figure 4:
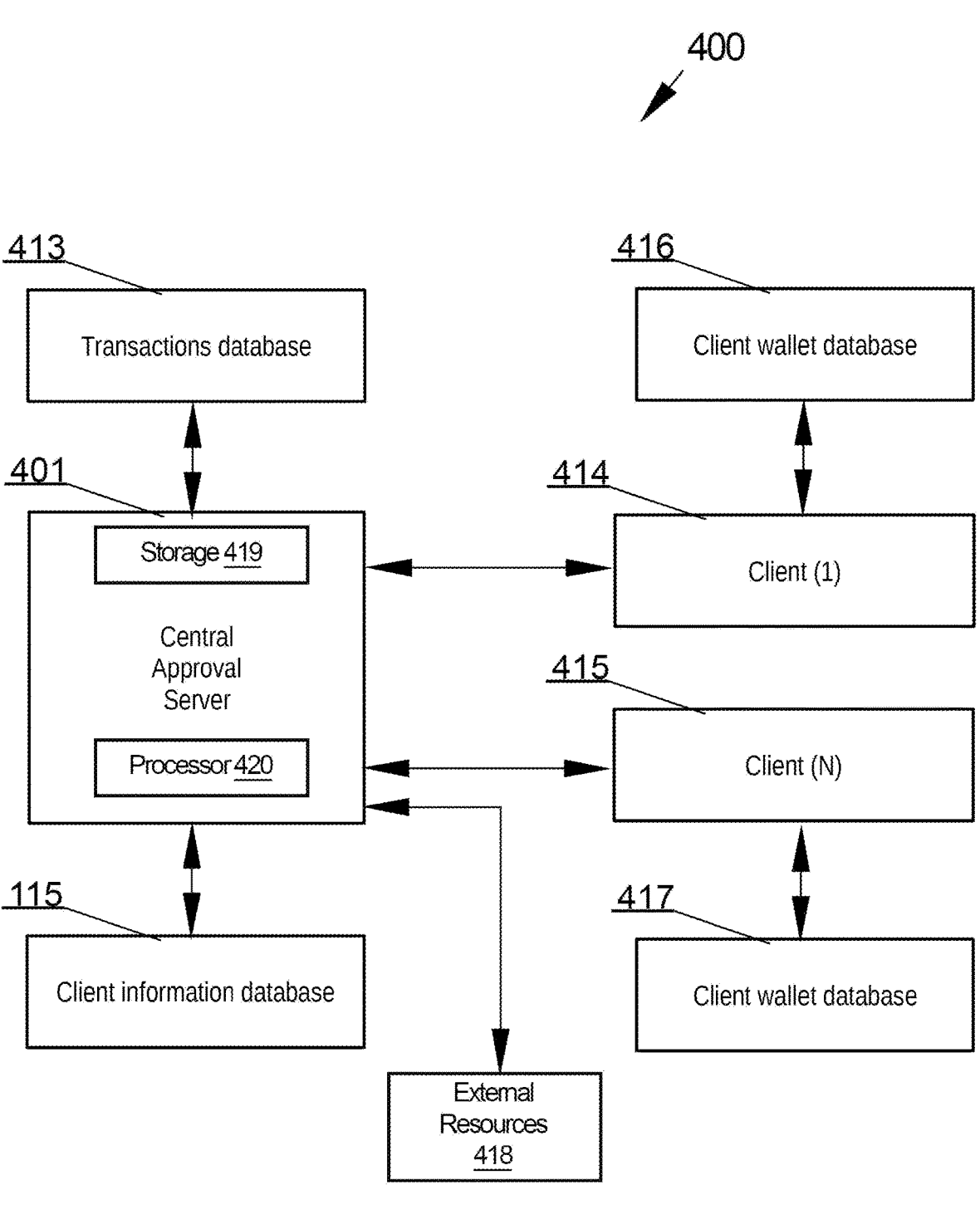
FIG. 4 presents a diagram of a system according to the present invention.

FIG. 4 presents a diagram of the system according to the present invention. The system is a client-server arrangement wherein the server is one or more central approval servers. The diagram illustrates an exemplary computer network ("system 400") in which one or more implementations of the present invention may be realized.

In some implementations, system 400 may include one or more servers 401. The server(s) 401 may be configured to communicate with one or more client computing platform(s) 414/415 according to a client/server architecture. The users may access system 400 via client computing platform(s) 414/415. The server(s) 401 and client computing platform(s) 414/415 may be configured to execute machine-readable instructions.

In some implementations, the server(s) 401, client computing platform(s) 414/415, and/or external resource(s) 418 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 401, client computing platform(s) 414/415, and/or external resource(s) 418 may be operatively linked via some other communication media.

A given client computing platform 414/415 may include one or more processors configured to execute machine-readable instructions. The machine-readable instructions may be configured to enable an expert or user associated with the given client computing platform 414/415 to interface with system 400 and/or external resource(s) 418, and/or provide other functionality attributed herein to client computing platform(s) 414/415. By way of non-limiting example, the given client computing platform 414/415 may include one or more of a desktop computer, a laptop computer, a handheld computer, a tablet computing platform, a NetBook, a Smartphone, a gaming console, and/or other computing platforms.

External resource(s) 418 may include sources of information, external entities participating with system 400, and/or other resource(s). In some implementations, some or all of the functionality attributed herein to external resource(s) 418 may be provided by resource(s) included in system 400.

Server(s) 401 and/or client computing platform(s) 414/415 may include electronic storage 419, one or more processors 420, and/or other components. Server(s) 401 may include communication lines, or ports to enable the exchange of information with a network and/or other computing platforms. Illustration of server(s) 401 in FIG. 1 is not intended to be limiting. Server(s) 401 may include a plurality of hardware, software, and/or firmware components operating together to provide the functionality attributed herein to server(s) 401. For example, server(s) 401 may be implemented by a cloud of computing platforms operating together as server(s) 401.

Electronic storage 419 may comprise non-transitory storage media that electronically stores information. The electronic storage media of electronic storage 419 may include one or both of system storage that is provided integrally (i.e., substantially non-removable) with server(s) 401 and/or removable storage that is removably connectable to server(s) 401 via, for example, a port (e.g., a USB port, a firewire port, etc.) or a drive (e.g., a disk drive, etc.). Electronic storage 419 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 419 may include one or more virtual storage resource(s) (e.g., cloud storage, a virtual private network, and/or other virtual storage resource(s)). Electronic storage 419 may store software algorithms, information determined by processor 420, information received from server(s) 401, information received from client computing platform(s) 414/415, and/or other information that enables server(s) 401 to function as described herein.

Processor 420 may be configured to provide information processing capabilities in server(s) 401. As such, processor 420 may include one or more of a digital processor, an analog processor, a digital circuit designed to process information, an analog circuit designed to process information, a state machine, and/or other mechanisms for electronically processing information. Although processor 420 is shown in FIG. 1 as a single entity, this is for illustrative purposes only. In some implementations, processor 420 may include a plurality of processing units. These processing units may be physically located within the same device, or processor 420 may represent processing functionality of a plurality of devices operating in coordination. Processor 420 may be configured to machine-readable instructions and/or components of machine-readable instructions by software; hardware; firmware; some combination of software, hardware, and/or firmware; and/or other mechanisms for configuring processing capabilities on processor 420. As used herein, the term "component" may refer to any component or set of components that perform the functionality attributed to the component. This may include one or more physical processors during execution of processor readable instructions, the processor readable instructions, circuitry, hardware, storage media, or any other components.

The client 414/415 and the server 401 may comprise data processing resources that may be realized using dedicated components or custom made FPGA or ASIC circuits. These computing resources are suitable to store and execute software implementing steps of the method according to the present invention.

The central approval server (401) processes client registration requests (FIG. 1), client cryptocurrency addresses (FIG. 2) client account update requests as well as cryptocurrency transactions (FIG. 3). The central approval server (401) thus cooperates with a client information database (404) (e.g. User X: legal name, date of birthday, home address, contact address, credential, cryptocurrency address, transaction criteria) as well as with a transactions database (413) (e.g. Transaction Y: transaction ID, sender and receiver's cryptocurrency addresses, amount of coins transacted, time of transaction and IP addresses of sender and receiver's client wallets).

Legal identities of owners for individual currency addresses are stored in the client information database (FIG. 1, 115). This fulfills the "know-your-customer" regulatory requirement and allows the system to be used as a payment system for commercial activities. However, such information is not accessible to the public, in order to maintain the pseudonymous property of the CBEM and its transaction network.

When coins are stolen from someone, the theft(s) or the hacker(s) can be easily traced by retrieving legal identity(s) of the receiver(s) from the client information database (115). Therefore, the implementation of the system prevents coins of the CBEM from being stolen.

Because of the pseudonymous or anonymous nature of Bitcoin and alterative cryptocurrencies based on the Bitcoin technology, coin balance of individual coin owners is not traceable by only analyzing the public transaction records stored in the blockchain. Furthermore, by design, when one spends only part of the coins recorded at a specific currency address, the amount of unspent coins is recorded at a newly generated currency address. Through analysis of the blockchain, it is computation intensive for a third party to track where a received sum of coins has been finally transacted to and recorded at what addresses.

With the present invention, an amount of coins owned by a valid registered user is completely traceable and trackable by the central governing body through analyzing the transaction records in the transactions database (413). Besides the capability of linking individual currency addresses to their owners, this unique property of the present system is contributed by recording unspent coins (if there is any) at the currency address from where the coins have just been sent/spent. In other words, the amount of coins recorded at a currency address will become zero only after all of the coins, which were previously sent to that address, have been sent/spent (322). This unique property not only simplifies a third party process for tracing and tracking the ownership transfers of cryptocurrency coins through analyzing the transaction records in the blockchain, but also allows applications of the system to financial and banking activities, particularly those required third-party auditing.

The central approval server (401) communicates with one or more clients (414, 415) implementing client wallets (416, 417).

A user of a wallet requests a transaction, which must be validated by one or more central approval servers (401). Therefore the clients are connected with the servers (401) via a suitable bidirectional communication link such as GSM, UMTS, DSL.

The invention may include means to identify and stop any suspicious or unauthorized transactions automatically. Moreover, this invention prevents a CBEM from (i) being used for money laundering and (ii) being stolen. The present invention hence allows the CBEM and its transaction network to comply with AML and (KYC) policies and regulations. For example, GlobalVision Systems' PATRIOT OFFICER, an advanced rule-based intelligent BSA/AML/ATF system, can be applied to effectively automate the BSA/AML/ATF workflow by monitoring, screening, detecting, alerting, investigating and analyzing suspicious activities of all transactions.

The invention provides a useful outcome, which is improved security and traceability of transactions. This result is also concrete and tangible since statistical measurements show improved security and fewer attempts of CBEM stealing. Therefore, the invention provides a useful, concrete and tangible result. The machine or transformation test is fulfilled by the fact that the improved security achieved by means of the present invention requires requiring generations of multisignature addresses and pay-to-script-hash transactions and their specific modifications, implementations and applications thereby transforming data associated with cryptocurrencies. Due to a specific implementation scheme the idea is not abstract.

It can be easily recognized, by one skilled in the art, that the aforementioned method for personal/client identification and verification may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

What is claimed is:

1. A system for providing personal identity verification and controlling transactions involving cryptography-based electronic money (CBEM), the system comprising:

one or more computer-readable storage media configured to store a transactions database;

a central approval server comprising one or more processors programmed to execute computer program instructions that, when executed, cause the central approval server to:

provide, via an encrypted network, a registration interface for submission of documents for verification of the legal identity of a registrant to create an account for a valid registered user;

allow only valid registered users to communicate with a client wallet associated with the valid registered user to generate one or more valid multisignature currency addresses;

allow only multisignature transactions;

receive at least a portion of one unit of CBEM by verifying a submitted credential with the central approval server;

record ownership of the CBEM into the transactions database using the one or more valid multisignature currency addresses, wherein generating the one or more multisignature currency addresses requires combining a client public key from the client wallet and an approval public key from the central approval server;

record CBEM transactions in the transactions database;

verify the CBEM transaction against one or more transaction approval rules at the central approval server, wherein each of the CBEM transactions is associated with a transaction request, wherein each transaction request is required to be signed using at least two private keys, wherein:

all transaction requests associated with the CBEM transactions are sent from the client wallets to the central approval server to obtain an approval private key for signing each of the CBEM transactions, wherein the approval private key is sent from the central approval server to a respective one of the client wallets upon approval of the transaction request to obtain the approval private key, wherein a transaction-validation script embedded inside a source code of the system enforces that only pay-to-script-hash multisignature transactions are generated and propagated and prevents signing of the CBEM transactions without the approval private key from the central approval server, wherein the central approval server releases the approval private key in response to:

receiving, via an API call, a request carrying the submitted credential; and verifying the submitted credential matches an active credential stored in a client information database;

the at least two private keys for signing each transaction request include the approval private key from the central approval server and the rest of the at least two private keys is or are each a private key stored in one of the client wallets; and the approval private key is restricted to be from the central approval server; and reject transactions requests that are not singed using at least two private keys, wherein transaction requests are only created in the presence of a valid credential, and wherein valid registered users remain pseudonymous to each other in multisignature transactions.

2. The system of claim 1, wherein any currency addresses that are not generated through the submission of a valid credential to the central approval server are not valid and are not able to receive any coins.

3. The system of claim 1, wherein individual transactions are monitored according to rules that identify, record, and report suspicious transactions.

4. The system of claim 1, wherein legal identities of owners of individual currency addresses are stored in the client information database.

5. The system of claim 1, wherein where transactions are suspected of illegal activities, the identities of the associated senders and receivers are extracted from the client information database by tracing the currency addresses of the senders and receivers.

6. The system of claim 1, wherein the transaction approval rules require a valid credential from the sender.

7. The system of claim 1, wherein the transaction approval rules require one or more approval private keys from the central approval server.

8. The system of claim 1, wherein the transaction approval rules allow only creation of multisignature transactions each requiring at least two private keys as signatures.

* * * * *